United States Patent [19]

Neri

[11] Patent Number: 4,607,252
[45] Date of Patent: Aug. 19, 1986

[54] MONITORING SYSTEM FOR PRODUCTION LINES

[75] Inventor: Armando Neri, Bologna, Italy

[73] Assignee: G.D. Societa per Azioni, Bologna, Italy

[21] Appl. No.: 566,369

[22] Filed: Dec. 28, 1983

[30] Foreign Application Priority Data

Feb. 15, 1983 [IT] Italy .................................. 3337 A/83

[51] Int. Cl.⁴ ...................... G08B 29/00; G05B 23/02
[52] U.S. Cl. .................................. 340/515; 340/506; 340/507; 340/511; 340/562; 340/825.06; 53/77; 493/10; 493/30; 493/31; 493/37
[58] Field of Search ............... 340/515, 500, 501, 502, 340/503, 504, 505, 506, 507, 508, 562, 509, 510, 511, 518, 825.05, 825.06, 825.16, 825.22, 679, 825.21; 53/52, 499, 77, 507, 508; 493/3, 10, 30, 31, 37; 131/909, 910

[56] References Cited

U.S. PATENT DOCUMENTS

| | | | |
|---|---|---|---|
| 3,638,191 | 1/1972 | Mann | 340/525 |
| 3,870,948 | 3/1975 | Holt et al. | 340/507 |
| 4,280,164 | 7/1981 | Kozek | 340/507 |
| 4,363,030 | 12/1982 | Maltby et al. | 340/507 |
| 4,441,302 | 4/1984 | Gabbitas et al. | 53/508 |

OTHER PUBLICATIONS

G.D. Societa Per Azioni, bulletin titled "Machine with Controller", 1985, 3 pages.
G.D. Societa Per Azioni, bulletin titled G.D. X1 Roll, 1985.
Fairchild Camera Corp., bulletin titled Semiconductor Circuit Application, Aug. 1978—pp. 3 and 73.

*Primary Examiner*—Donnie L. Crosland
*Attorney, Agent, or Firm*—Frost & Jacobs

[57] ABSTRACT

A system for monitoring the operation of an input transducer of a central control unit for machines employed in production and product packaging lines, the system having a first circuit for detecting operating defects of the input transducer including a first subcircuit for producing a change in the operating condition of the transducer to produce a corresponding change in the logic signal of the transducer, and a second subcircuit for detecting the change in the logic signal and operating a control alarm based upon the detected change in the logic signal, the system also including a second circuit for providing a signal from the transducer to the central control and monitoring unit based upon the operating condition of the transducer.

12 Claims, 3 Drawing Figures

MONITORING SYSTEM FOR PRODUCTION LINES

BACKGROUND OF THE INVENTION

The present invention relates to a system for monitoring the operation of input transducers of a central control and monitoring unit for machines and/or devices usable in the production and/or product packaging lines, for example production lines for cigarettes and/or lines for packaging packets of cigarettes. Such lines can for example include cigarette-making machines, filter fitters, packaging machines, cellophaning machines, cartonising and parcelling machines. As is known, such individual machines or production lines are controlled by a central control and monitoring unit, which in dependence on determined signals emitted by input transducers, determines the operation of various output transducers, at suitable instances, such output transducers belonging also to different machines in the same lines.

SUMMARY OF THE INVENTION

The object of the present invention is that of increasing the operating reliability of such input transducers by verifying the correct operation thereof in a relatively simple and immediate manner.

According to the present invention there is provided a system for monitoring the operation of input transducers of a central control monitoring unit for machines and/or devices usable in production and/or product packaging lines, characterised by the fact that it includes first circuit means for detecting possible operating defects of the transducers, and second circuit means operable to provide a logic type two level signal from the transducers to the central unit in dependence on the operating condition of the transducers, the said first circuit means including first means operable to produce a change in the operating condition of the transducers with respect to that existing in the operating conditions immediately preceding that monitored, to produce a corresponding change in the level of the logic type signal, and second means operable to detect the occurrence or not of the change in level of said logic type signal and operable to control alarm means.

BRIEF DESCRIPTION OF THE DRAWINGS

For a better understanding of the present invention two embodiments thereof will now be described, by way of a non-limiting example, with reference to the attached drawings, in which.

DETAILED DESCRIPTION OF THE INVENTION

Figure 1:
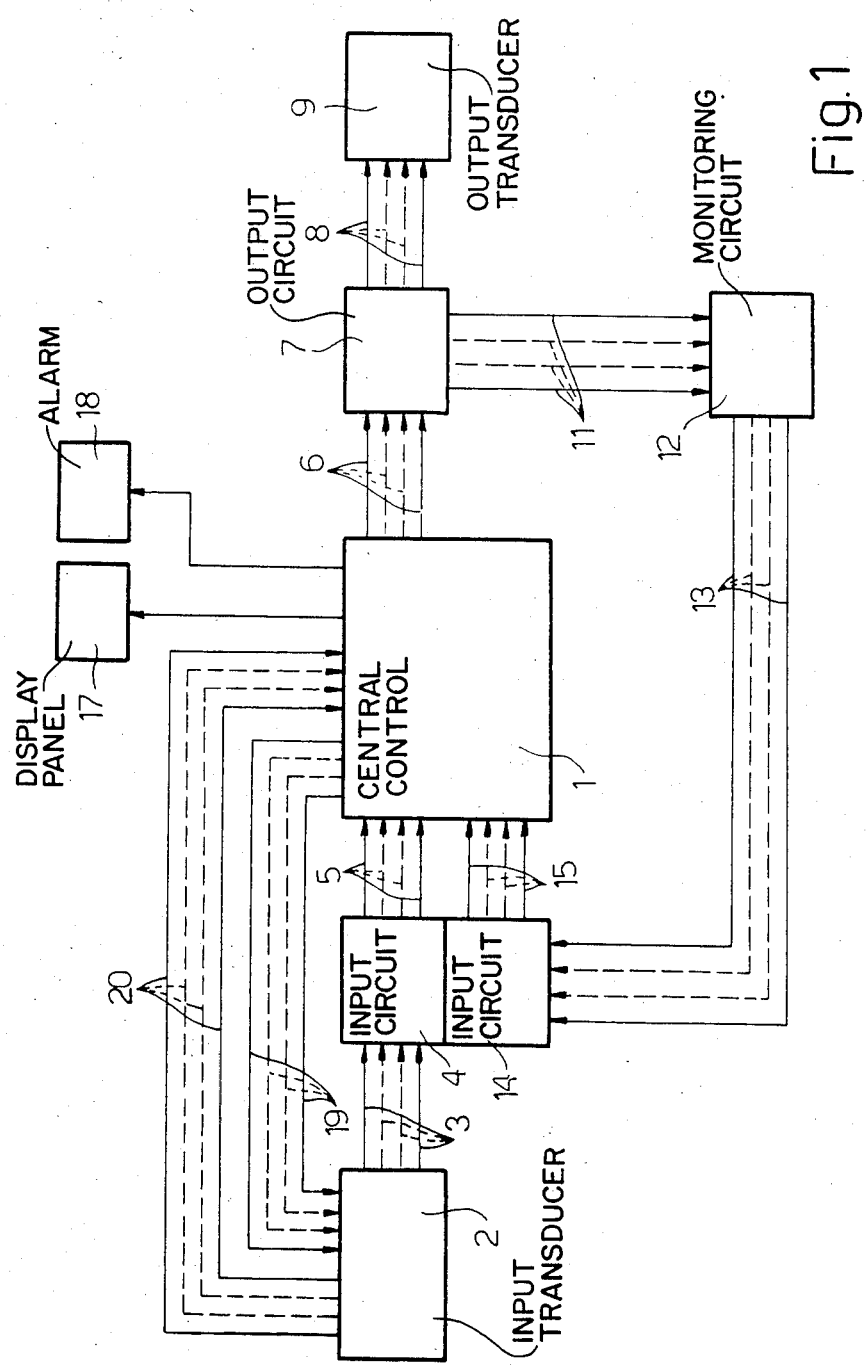
FIG. 1 is a block diagram of the system for monitoring the operation of input transducers of a central control and monitoring unit formed according to the present invention.

With reference to FIG. 1, there is shown, generally indicated with the reference numeral 1, a central control and monitoring unit for machines and/or devices usable in production and/or product packaging lines, in particular lines for the production and packaging of packets of cigarettes.

As has already been indicated above, in a known configuration such lines include a plurality of input transducers 2 which are coupled by respective output signal connections 3 to respective input circuits 4, connected by means of respective connections 5 to the central unit 1. This unit 1 is in turn connected with the respective connections 6 to respective output circuits 7, connected by respective connections 8 to respective output transducers 9.

The output circuits 7 are then respectively connected, by connections or couplings 11, to respective monitoring circuits 12, which are connected by respective connections 13 to respective input circuits 14 connected by respective connections 15 to the central unit 1.

This central unit 1 is then connected to various input transducers 2 by respective connections 19 for sending a monitoring signal towards the transducers 2, and by respective connections 20 for sending respective alarm signals towards the central unit 1.

A fault display panel 17 and a block 18 for controlling the stopping of the machine or of the line is connected to this central unit 1. Each input transducer 2 is thus connected by a connection 3 to a respective input circuit 4 connected, by means of a connection 5, to the unit 1. These input circuits 4 are thus equal in number to the number of input transducers 2.

Each input transducer 2 is further connected, by a respective connection 19 and a respective connection 20 to the central unit 1. Connected to the output of this central unit 1, therefore, are the same number of output circuits 7 as there are output transducers 9, and likewise the monitoring circuits 12 and the input circuits 14 are equal in number.

Figure 2:
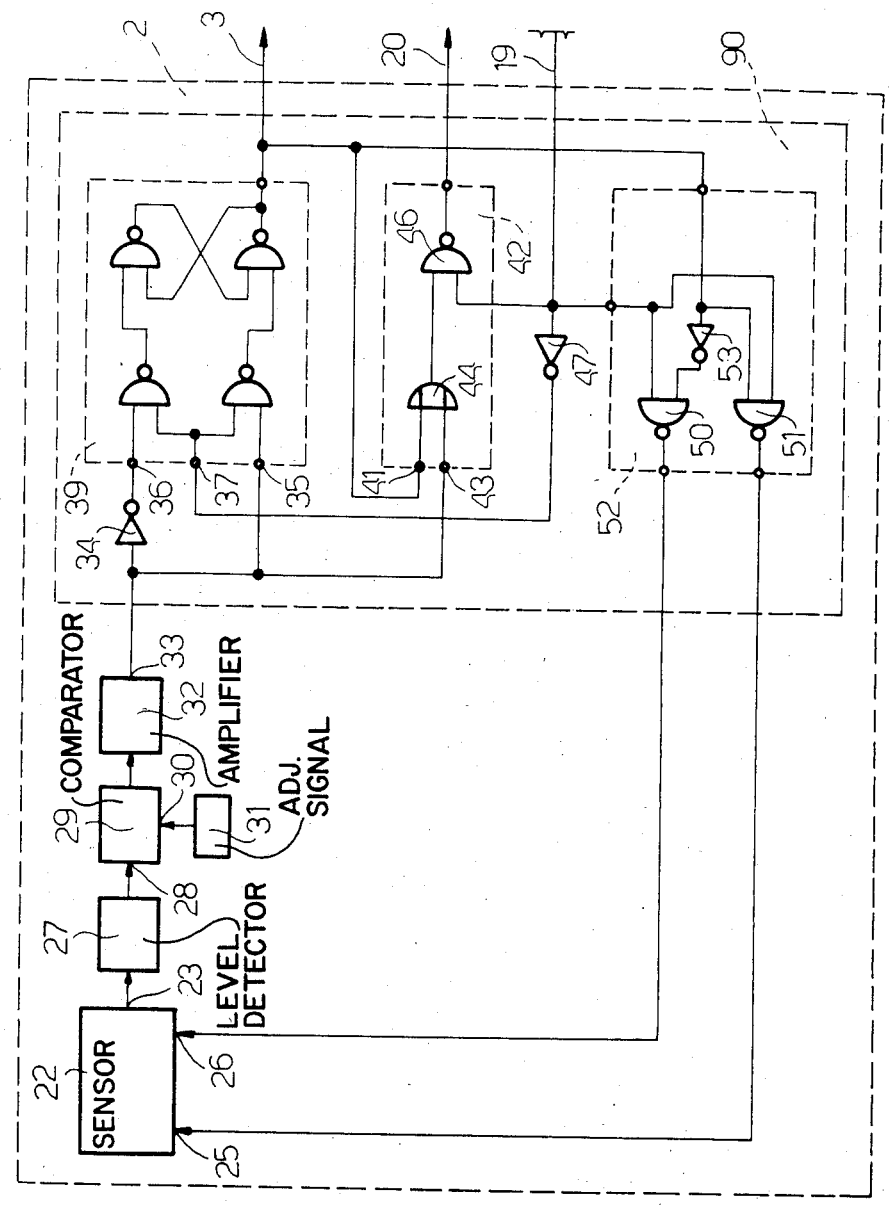
FIG. 2 is a block and circuit diagram of a unit forming a component of the diagram of FIG. 1.

In FIG. 2 there is illustrated in detail an embodiment of the input transducer 2. The numeral 22 generally indicates a known type of proximity sensor of inductive or capacitive type, comprising a winding or a capacitor connected to an oscillator block and operable to provide an alternating output signal at an output 23, the amplitude of which output signal is a function of the inductance or capacity at the input of the oscillator, determined by the proximity or not of the object to be detected. It is supposed, for example, that the presence of the object in the range of sensitivity of the sensor causes a greater amplitude of the signal from the output 23.

This sensor block 22 further has two inputs 25 and 26 at which a signal at the logic level "0" has respectively the effect of damping or triggering the amplitude of the oscillations of the oscillator of the block 22. The output 23 of the block 22 is connected, via a signal levelling detector block 27, to a first input 28 of a comparator block 29 which has another input 30 at which arrives a threshold adjustment signal from a block 31.

The output of the comparator block 29 is connected to the input of an amplifier block 32, having an output 33 at which is present a signal of logic type. This output 33 is connected directly and via an inverter 34 to two inputs respectively 35 and 36 of a circuit 39 known as a "RS triggered flip-flop" which has the operating characteristics of maintaining unaltered the signal at the output when the signal at a clock input 37 is at a logic level "0", and of allowing a variation of the logic level of the signal at the output only when the signal at the clock input 37 passes from "0" to "1". This circuit 39 is constituted by four NAND gates, the first two of which have, as inputs, respectively the clock signal from the input 37 and one of the signals from the inputs 35 and 36, and the outputs of which go to an input of the other two NAND gates at the other inputs of which arrive the outputs, crossed over, of the gates themselves. The output of the circuit 39 is connected to the connection 3 leading to the central unit 1, and further is connected to a first input 41 of a comparison circuit 42, which has another input 43 connected to the output 33 of the amplifier block 32. These two inputs 41 and 43 are connected to the two inputs of an exclusive OR logic circuit 44, which has the following operating table:

| 41 | 43 | OUTPUT |
|----|----|--------|
| 0  | 0  | 1      |
| 0  | 1  | 0      |
| 1  | 0  | 0      |
| 1  | 1  | 1      |

The output of the circuit 44 is connected to an input of a NAND gate 46 the other input of which is connected to the connection 19 from the central unit 1, and the output of which is connected to the connection 20 leading to the central unit 1. This connection 19 is connected, via an inverter 47, to the input 37 of the circuit 39 and is further connected to two respective inputs of two NAND gates 50 and 51 of a selection circuit 52.

The output of circuit 39 is directly connected to the other input of gate 51 and to the other input of gate 50 via an inverter 53. The outputs of the gates 50 and 51 are then respectively connected to the inputs 26 and 25 of the block 22. The circuits 39, 42 and 52 constitute a circuit part for detection of defects of the transducer 2 as will be described.

Figure 3:
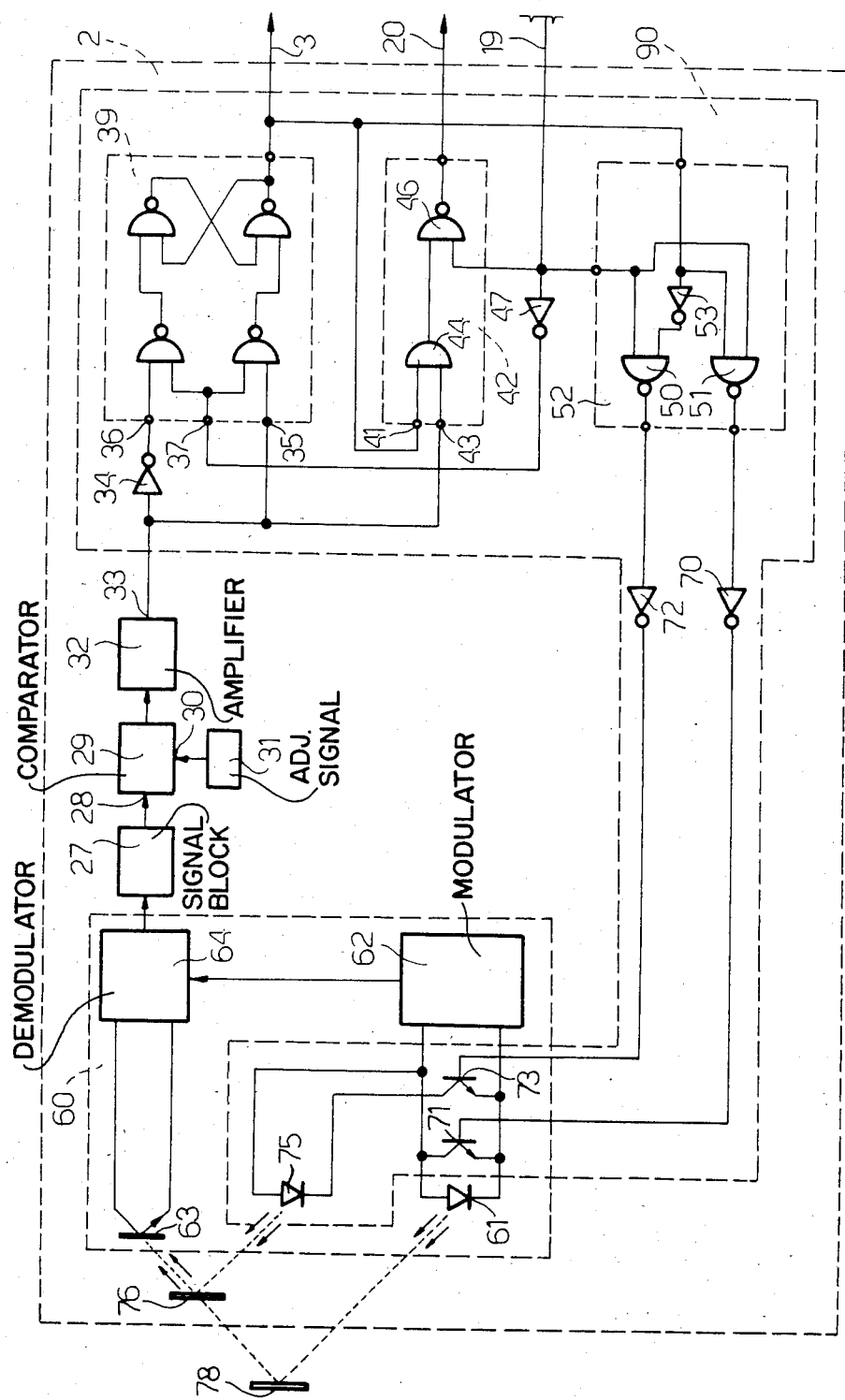
FIG. 3 is a block and circuit diagram of an alternative embodiment of the unit of FIG. 2.

In FIG. 3 there is illustrated a different embodiment of the input transducer 2, which rather than including a proximity sensor block 22 of inductive or capacitive type includes a photo-electric cell sensor device 60 comprising, in a known way, a photo-diode 61 supplied by a modulator block 62 with pulses at high frequency, for example 1 KHz, whereby to energise the photo-diode 61 for very short instants at high power, to be able to allow the photo-diode 61 itself to be positioned at a relative distance from a photo-transistor 63, and avoid disturbances from external lights. The photo-transistor 63 is connected to a demodulator block 64 the output of which is connected to the input of the detector block 27 already described in FIG. 2. All the circuit downstream of the block 27 is identical with that already illustrated in FIG. 2 and is indicated with the same reference numerals.

The output of the NAND gate 51 is connected through an inverter 70 to the base of a transistor 71 the collector and emitter of which are connected respectively to the anode and cathode of the photo-diode 61. The output of the NAND gate 50 is connected through an inverter 72 to the base of a transistor 73 also connected to the collector and emitter and parallel to the photo-diode 61, but with a photo-diode 75 disposed in the collector branch and with the cathode connected to the collector itself. The photo-diode 74 is disposed in such a way that light emitted from it is reflected by a reflector plate 76 towards the photo-transistor 63. The plate 76 is on the other hand transparent to light emitted by the photo-diode 61. When this light is reflected by an object 78 the presence of which is to be detected by means of the device 60, it therefore reaches the photo-transistor 63.

The operation of the system for monitoring the operation of input transducers 2 formed according to the present invention is as follows.

With reference to FIG. 2, it is supposed that the input transducer 2 is in normal operating conditions in which there is no object present in the detecting range of the sensor itself. In these conditions the alternating signal at the output of the block 22, which arrives, through the detector 27, at the input 28 of the comparator 29, is less than the threshold value established by the block 31. Consequently the logic signal at the output of the comparator block 29 is at logic level "0". At the inputs 35 and 36 of the memory circuit 39 are present, respectively, signals at logic level "0" and "1", and in these normal operating conditions there is no monitoring signal on the connection 19 so that at the input 37 of the memory circuit 39 there is a signal at logic level "1".

On the connection 3 to the output of the circuit 39 there is therefore a signal at logic level "0", which is sent to the central unit 1. At the inputs 41 and 43 of the comparison circuit 42 there are present signals at logic level "0" so that at the output of the circuit 44 there is a signal at logic level "1" which arrives at the gate 46.

Since at the other input of the gate 46 there is a signal at logic level "0", on the connection 20 to the output of the gate 46 there is a signal at logic level "1" which, because of the circuit configuration within the central unit 1, does not give any alarm signal for the block 17 (this block 17 is in fact activated when the signal on the connection 20 is at logic level "0".)

In these conditions the outputs of the gates 50 and 51 are at logic level "1" so that, as explained above, the operation of the block 22 is not affected.

When the sensor block 22 detects the presence of a determined object it generates at the output 23 an alternating signal at a level such as to produce a signal at logic level "1" at the output of the comparator block 29. A signal at logic level "1" will therefore be present at the output of the memory block 39 on the connection 3, for the necessary indication to the central unit 1, whilst a signal at logic level "1" will always be present at the output of the comparison circuit 42 on the connection 20, in such a way as not to activate any alarm. The outputs of the gates 50 and 51 will always be at logic level "1" so as not to alter the operation of the sensor block 22.

It is now supposed that monitoring of the operation of the sensor 22 is to be effected. This monitoring, which can be effected for example at the commencement of a cycle of operation or in the dead times of the cycle itself, is controlled by the central unit 1 by sending, for a predetermined period of time, a signal at logic level "1" on the connection 19. In this monitoring condition (signal at logic level "1" on the connection 19) and on the hypothesis of an object being present in the sensing range of the sensor 22 (signal at logic level "1" at the output of the block 39) the signal at the output of the gate 51 passes from logic level "1" to the logic level "0". This signal at logic level "0" applied to the input 25 of the block 22 controls damping of the oscillations at the output of the block 22 itself.

If the sensor block 22 is operating correctly, the output of the comparator block 29 and the output of the amplifier block 22 will pass to logic level "0". Because the signal applied to the clock input 37 of the memory circuit 39 is at logic level "0", the signal at the output of this circuit 39 does not change logic level, remaining always logic level "1".

In this way the information at the central unit 1, determined by the presence of an object in the field of detection of sensor 22, is not altered by the operational monitoring effected on the transducer itself.

At the inputs 41 and 43 of the comparison circuit 42 therefore, there arrive signals respectively at logic level "1" and "0", so that at the output of the circuit 44 there will be a signal at logic level "0", which because of the presence of the signal at logic level "1" at the other input of the gate 46 causes a signal at logic level "1" to be always present at the output of the gate 46. In this way there is no alarm signal inasmuch as, effectively, the sensor block 22 has operated correctly.

At the end of the monitoring signal, the logic signal on the connection 19 passes from "1" to "0" and consequently the outputs of the gates 50 and 51 return to logic level "1".

Thus, the influence of the monitoring signal on the sensor block 22 ceases so that the block 22 can therefore provide an output signal in dependence on the presence or otherwise of the object in the field of detection of the sensor, and the associated output signal can arrive at the inputs 35 and 36 of the circuit 39 consequently determining the logic level "0" or "1" of the output signal for the connection 3 leading to the central unit 1.

On the other hand, if the sensor block 22 be faulty, during this monitoring by means of the signal at logic level "1" on the connection 19, there is a signal at logic level "0" at the output of the gate 51 and therefore at the input 25 of the block 22. Because of the fault on this block the logic level of the signal at the output of the comparator block 29 does not vary but remains therefore always at logic level "1" with the initially made suppositions, so that at the inputs 41 and 43 of the comparison circuit 42 arrive signals at logic level "1", which cause a signal at logic level "1" at the output of the circuit 44.

At the two inputs of the gate 46 therefore arrive two signals at logic level "1" which cause an output signal at logic level "0" which, via the connection 20 is sent to the central unit 1 to activate the alarm display panel 17. On the other hand, if the operational monitoring is effected when there is no object in the detection field of the sensor, and therefore the signal at the output of the comparator block 29 is at logic level "0", when a monitoring signal at logic level "1" is sent on the connection 19, at the output of the gate 50 of the circuit 52 there is present a signal at logic level "0". This signal, applied to the input 26 of the block 22, causes triggering of the oscillations and consequently the signal at the output of the comparator block 29 passes to logic level "1" in the case of correct operation of the sensor block 22.

In the case of a fault on the block 22, the output of the comparator block 29 remains, however, at logic level "0", and only in this latter condition will there be a signal at logic level "0" at the output of the gate 46, with consequent alarm signal for the central unit 1.

The circuit 90 for monitoring the operation of the input transducer as illustrated in FIG. 3 has a similar function to that described with reference to the transducer of FIG. 2. In normal operating conditions the luminous signal emitted by the photo-diode 61 in the presence of the object 78 to be detected is reflected and, traversing the reflector 76 arrives at the photo-transistor 63. In these conditions there is therefore a signal at logic level "1" present at the output of the comparator block 29, and a corresponding signal at logic level "1" is present on the connection 3. The output of the gates 50 and 51 is at logic level "1", and therefore the outputs of the inverters 70 and 72 are at logic level "0". Therefore the transistor 71 is switched off and does not alter the operation of the photo-diode 61, and therefore the transistor 73 is also switched off which maintains the photo-diode 75 extinguished.

On the other hand, when the object 78 is not present, no signal is reflected onto the photo-transistor 63, so that the signal at the output of the comparator block 29 is at logic level "0", and thus the signal on the connection 3 is also at logic level "0". However, the transistors 71 and 73 remain always switched off so that the photo-diode 61 functions normally and the photo-diode 75 is extinguished.

If the operational monitoring has to be effected on the photo-electric cell block 60, starting from the conditions in which the object 78 is present, and therefore a signal at logic level "1" is present at the output of the comparator block 29, when the monitoring signal at logic level "1" is applied to the connection 19 of the central unit 1 the output of the gate 51 passes to logic level "0". Consequently, via the inverter 70 the transistor 71 is activated to cause the photo-diode 61 to become extinguished and therefore the direct signal on the photo-transistor 63 is annulled. In these conditions the signal at the output of the comparator block 29 passes to logic level "0" and the signal on the connection 20 maintains its logic level "1", not causing any alarm signal.

On the other hand, if the photo-electric cell block 60 is faulty, the logic level of the signal at the output of the comparator block 29 does not change so that there is a signal at logic level "0" on the connection 20 for transmitting an alarm to the central unit 1.

If the operational monitoring is effected, on the other hand, starting from the conditions in which the object 78 is not present, so that the signal at the output of the comparator block 29 is at logic level "0", upon application of the monitoring signal at logic level "1" on the connection 19 the output signal of the gate 50 passes to logic level "0". This signal causes, via the inverter 72, activation of the transistor 73 and consequent activation of the photo-diode 75. The light emitted by the photo-diode 75 is reflected by the reflector plate 76 onto the photo-transistor 63 which, therefore, in correct operating conditions of the block 60, causes the signal at the output of the comparator block 29 to pass to logic level "1".

If the block 60 is faulty the output of the block 29 however remains always at logic level "0" so that in this case a signal at logic level "0" is caused on the connection 20 to give an alarm indication.

From what has been described the advantages obtained with the operation monitoring system for input transducers of a central control and monitoring unit for machines and/or devices useful in production and/or packaging lines formed according to the present invention will be apparent.

In particular the correct operation of the sensor, whether it be of inductive or capacitive type, or a photo-electric cell, can be verified in any operating conditions of the sensor itself in that the operation monitoring circuit 90, in particular through the circuit 52, automatically verifies the operating conditions of the sensor and controls a change of logic state of the output signal which it produces. The correct operation of the sensor is therefore detected by the comparison circuit 42.

Further, this monitoring of the sensor is effected without altering any connection and without altering the correct signal sent to the central unit 1 in that the memory circuit 39, during the time in which the monitoring signal is present on the connection 19, maintains the logic value of the signal at its output to the connections 3 unaltered.

Finally, it is clear that the embodiments of the present invention described above can be modified and varied without departing from the scope of the invention itself. In particular, the circuits described can also be formed differently, and the monitoring circuit 90 can be applied to sensors of different types even from those described, providing always a change of level in the signal produced by them in their various operating conditions is obtained.

I claim:

1. A system for monitoring the operation of input transducers employed in a central control and monitoring unit for machines used in production and product packaging lines, comprising: first circuit means for detecting operating defects of said transducers, and second circuit means operable to provide a signal of a two-level logic type from said transducers to said central unit in dependence upon plural operating conditions of said transducers, said first circuit means including production means operable to produce a change in the operating conditions of said transducers with respect to an immediately preceding operating condition and to produce a corresponding change in the level of said logic type signal, and detection means operable to detect said change in the level of said logic type signal and operable to control an alarm means, said central control and monitoring unit providing a monitoring signal of the two-level logic type for controlling the activation of said production means, and blocking means operable in response to said monitoring signal to block modifications of said logic type signal when said monitoring signal is sent to said production means.

2. A system according to claim 1, wherein said blocking means includes a triggered RS flip-flop circuit.

3. The system according to claim 2, wherein said triggered RS flip-flop circuit includes two inputs which receive complementary logic level signals from said second circuit means and said monitoring signal, and provides at its output the logic level signal for said central unit.

4. The system according to claim 1, wherein said detection means is connected to receive said logic level signal from said second circuit means and from said blocking means and includes a first comparator means for detecting equality of said logic level signals, said first comparator means controlling said alarm means through a second comparator means controlled by said monitoring signal.

5. A system according to claim 4, wherein said first comparator means includes a logic circuit of the "exclusive or" type.

6. A system according to claim 1, wherein said production means is connected to receive said logic level signal from said blocking means and from said monitoring signal, and is operable to provide two respective signals for controlling the change of the operating condition of said transducer with respect to the level of the logic type signal provided by said second circuit means.

7. A system according to claim 6, wherein said transducers include a proximity sensor of the inductive type.

8. A system according to claim 6 wherein said transducers include a proximity sensor of the capacitive type.

9. A system according to claim 6 wherein said two respective signals are sent to two respective inputs of an oscillator coupled to said proximity sensor, respectively operable to dampen and to trigger the oscillations produced by said oscillator.

10. A system according to claim 6 wherein said transducer includes a photo-electric cell sensor.

11. A system according to claim 10, wherein said two respective signals are sent respectively to a first photo-emitter element for deenergizing said photo-electric cell sensor and to a second photo-emitter element of said photo-electric cell sensor.

12. A system according to claim 1, wherein said transducer includes a sensor element for sensing a proximate object, said second circuit means including a detector unit disposed at the output of said sensor element, and a comparator unit at the output of which there is disposed an amplifier which provides said logic type signal.

* * * * *